United States Patent [19]
Austin

[11] 3,844,775
[45] Oct. 29, 1974

[54] POLYNARY GERMANIDES AND SILICIDES

[75] Inventor: Alfred E. Austin, Worthington, Ohio

[73] Assignee: E. I. du Pont de Nemours and Company, Wilmington, Del.

[22] Filed: Nov. 24, 1972

[21] Appl. No.: 309,450

[52] U.S. Cl. ............ 75/134 F, 75/134 M, 75/134 G, 75/134 S
[51] Int. Cl. ............................................ C22c 31/00
[58] Field of Search .......... 75/134 M, 134 F, 134 G, 75/134 S

[56] References Cited
UNITED STATES PATENTS
2,856,281  10/1958  Cremer et al. .................. 75/134 F OTHER PUBLICATIONS
L. Castelliz: Monatshi 84, 765–776, (1953).
Y. B. Kuzma et al.: Russian Journal of Inorganic Chemistry, (English translation) 8, 1028, (1964).
Y. B. Kuzma et al.: Russian Journal of Inorganic Chemistry, (English translation) 9, 373, (1964).

*Primary Examiner*—L. Dewayne Rutledge
*Assistant Examiner*—E. L. Weise

[57] ABSTRACT

Disclosed herein are compositions of the formula

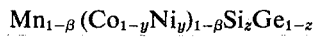

$$Mn_{1-\beta}(Co_{1-y}Ni_y)_{1-\beta}Si_zGe_{1-z}$$

wherein
  $y$ is 0 to 1.0
  $z$ is 0 to 0.6 and
  $\alpha + \beta$ is 0 to 0.1, having orthorhombic crystal structure at 270°K and transforming with accompanying volume decrease to hexagonal crystal structure at a temperature above 270°K and below about 1,000°K. These compositions are useful for temperature activated switches effective over a wide range of temperatures. The process comprises reacting at elevated temperatures, in an inert atmosphere, the compound elements in stoichiometric amounts based upon the composition(s) being made.

14 Claims, 1 Drawing Figure

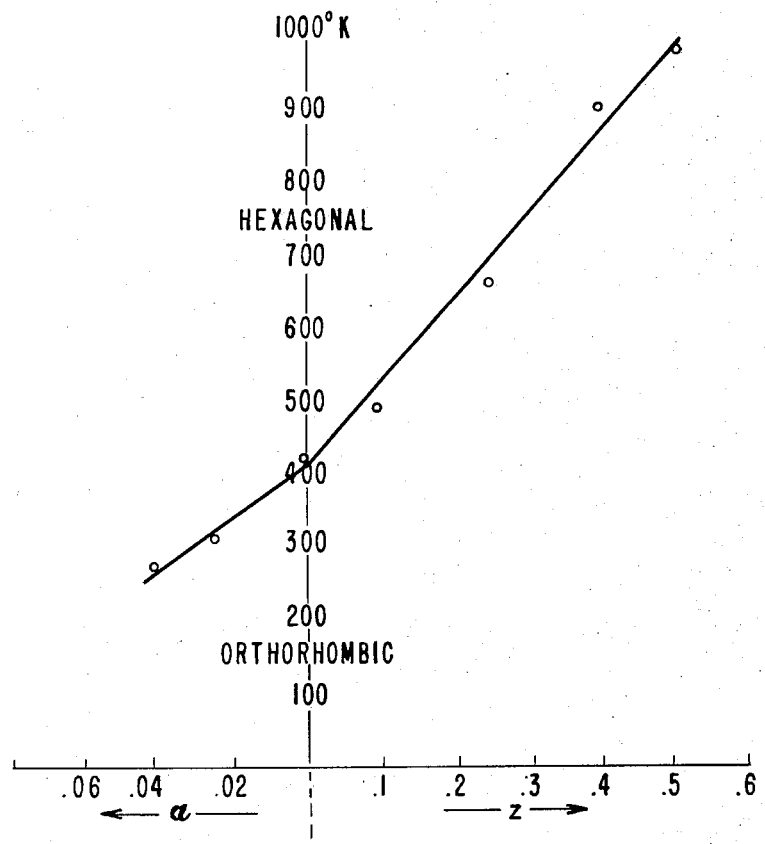

POLYNARY GERMANIDES AND SILICIDES

BACKGROUND OF THE INVENTION

1. Field of the Invention

This invention concerns compositions in the system Mn—Co—Ni—Ge—Si, and a process therefor.

2. Description of the Prior Art

The ternary compositions MnFeGe, MnCoGe and MnNiGe were investigated by Castelliz in 1953 (Monatshefte fuer Chemie 84, 765–776). These ternary compositions were said to exist in the filled-up B8 Type of hexagonal structure, whether obtained by quenching or by slow cooling to room temperature. This hexagonal structure in the Mn—Ni—Ge system was said to extend from the completely filled equiatomic composition MnNiGe to the less filled up $Mn_{1.3}Ni_{0.4}Ge$.

The ternary silicides, MnCoSi and MnNiSi were described in 1964 by Kuz'ma and coworkers (Russian Journal of Inorganic Chemistry 8, 1,028 and 9, 373; English translation) and their structure determined by Shoemaker et al. (Acta Cryst. 18, 900; 1965) and Jeitschko et al. (Trans. of the Met. Soc. of AIME 245, 335; 1969). Both have orthorhombic structures of the anti-$PbCl_2$ type.

There is no suggestion in the art of the iso-structural compositions of this invention transformable with accompanying decrease in volume from orthorhombic structure at 270°K to hexagonal structure at some temperature above 270°K and up to about 1,000°K.

SUMMARY AND DETAILS OF THE INVENTION

This invention concerns compositions of formula

$$Mn_{1-\alpha}(Co_{1-y}Ni_y)_{1-\beta} Si_zGe_{1-z}$$

wherein y is 0 to 1.0 z is 0 to 0.6 and $\alpha + \beta$ is 0 to 0.1, having orthorhombic crystal structure at 270°K and transforming with accompanying volume decrease to hexagonal crystal structure at a temperature above 270°K and up to about 1,000°K.

An important feature of these compositions is the fact that at the transformation temperature the volume of the high-temperature hexagonal phase is less than that of the low temperature orthorhombic phase. This uncommon phenomenon contrasts with the usually greater volume of a higher temperature phase and works in opposition to the normal thermal expansion of any phase on heating. The magnitude of the volume contraction is large enough to produce major mechanical effects.

The compositions of this invention are magnetic with substantial magnetizations near room temperature and with Curie temperatures ranging from about 0° to about 200°C. The influence of composition on Curie temperature generally parallels that of the crystallographic transition but is quantitatively smaller.

It must be appreciated that switching from the low temperature ferromagnetic state to the high temperature paramagnetic state is not in exact correspondence to the crystallographic phase transition. However, all compositions defined as having crystallographic phase changes between 270° and 1,000°K are useful as magnetic switches but only in certain cases (e.g., $CoMn_{0.96}Ge$) are the magnetic and crystallographic phase transitions coincident.

The transformation temperature at which the hexagonal and orthorhombic phases are in equilibrium is determined most conveniently with standard calorimetric procedures such as DTA (differential thermal analysis; see e.g., the book of that title by R. C. Mackenzie, Vol. 1, Academic Press, 1970). While a skilled practitioner of DTA can readily distinguish a first order phase transition from other thermal effects, confirmation may be made by taking X-ray powder photographs on either side of the indicated transformation temperature. The interplanar spacings can readily be used to show the hexagonal symmetry above and the orthorhombic symmetry below the transition temperature (see e.g., The Powder Method by L. Azaroff & M. Buerger, McGraw-Hill 1958 pp 46–53). The temperature of the phase transition may also be determined by other methods such as dilatometry or by comparing the magnetization-temperature behavior with that of theoretical models.

The transformation is quite fast and reversible but with considerable hysteresis, suggesting a first order diffusionless mechanism. The degree of hysteresis increases with increasing temperature of transformation. The amount of hysteresis will depend somewhat on such factors as crystallite size and purity. The transformation on cooling may occur as much as 30°C. below that on heating for transformations near room temperature, and may lag by as much as 150°C. at the highest transformation temperature. The average temperature of that upon heating $T_h$ and that upon cooling $T_c$ may be used for convenience.

The volume change which occurs upon transformation is normally obtained using the expressions $V_{ortho.}=\frac{1}{2}a \cdot b \cdot c$ and $V_{hex.}=a2c \sin 120°$ where $a$, $b$ and $c$ are unit cell dimensions extrapolated to the transformation temperature. The factor ½ in the orthorhombic formula is used to convert the volume to the same basis used for hexagonal, i.e., the volume of a unit cell containing two molecules.

The compositions of this invention are useful in the following manner. Although utility is explained in terms of the particular composition of Example 1, all of the compositions described herein will work in similar fashion. A crystal of $Mn_{0.96}CoGe$, several millimeters in length, is made part of an electrical circuit by inserting it into the circuit and connecting it thereto by means of silver paste at each end of the crystal. The circuit is then used to conduct an electric current for any desired purpose. The circuit is broken by cooling, say, at dry ice temperatures causing the crystal to shatter on going through the crystallographic transformation and its composite parts to separate.

In fine particle form (for increased coercivity) the compositions can be used in permanent magnets or in magnetic recording. The latter use would be particularly adapted to thermomagnetic recording because of the desirable Curie temperatures of these compositions.

Process

The compositions of the invention are prepared by heating together the compound elements in a completely inert environment. The extreme sensitivity of structure to stoichiometry requires that the component elements be as pure as possible and be very accurately weighed and mixed. Final analysis for the component elements will provide confirmation that major amounts of the initial mixture were not lost. Alumina vessels may be used to contain the mixture. While silica tubes are convenient for evacuation or confining an inert gas the mixture can be contaminated by direct contact with silica. Reaction in a sealed, evacuated vessel is preferred. If an inert gas is used to blanket the reaction, argon or helium is preferred after an assurance that it is free of nitrogen, oxygen or water vapor.

The elements can be combined by melting or by solid state reaction. The preferred method is to heat well-mixed powders of the elements at a temperature somewhat below the melting point of the composition, at any rate between 600°C. to 1,200°C., in several stages with intermediate grinding to insure complete reaction. Induction melting or arc melting reactions may be used but increase the difficulty of maintaining exact stoichiometry.

Unless extreme care is taken to avoid traces of oxygen, nitrogen and water vapor, for example, preparations intended to produce the desired stoichiometry of this invention produce instead a hexagonal phase (which is too metal-deficient to transform), along with very undesirable traces of metal oxides or nitrides.

BRIEF DESCRIPTION OF THE DRAWING

The FIGURE shows the effect of composition on the transition temperatures of the novel compositions. The transition temperature in °K is indicated on the ordinate while the abscissa indicates compositional changes in stoichiometry $Mn_{1-\alpha}(Co_{1-y}Ni_y)_{1-\beta}Si_zGe_{1-z}$ from, the prototype where $\alpha$, $\beta$, $y$ and $z$ are all equal to 0, i.e., MnCoGe. The left-hand portion of the FIGURE shows the pronounced influence of manganese deficiency $\alpha$, on the transformations of MnCoGe. If only 5 percent of the Mn sites are vacant ($\alpha = 0.05$) then the hexagonal high temperature phase is stabilized to such an extent that it persists unchanged even upon drastic cooling well below room temperature.

The right-hand portion of the FIGURE shows that the substitution of silicon for germanium can be used to extend the useful phase transitions to as high as about 1,000°K. As silicon substitution exceeds about 60 percent of the non-metal sites the separation into more complex polyphase mixtures reduces the effectiveness of a sharp transition between two clearly defined phases. Within the composition limits described, the products exist essentially as single phase materials, either hexagonal or orthorhombic depending on temperature.

It has been discovered that if a small fraction of the Ni or Co sites are vacant the transition temperature decreases abruptly. Thus, if 10 percent of Co sites in MnCoGe are unoccupied only the hexagonal phase can be obtained.

It is well noted that nickel may also be substituted for cobalt in its entirety. The effect on transformation temperature is not large but the replacement of cobalt by nickel lowers the Curie temperature of the germanides and increases it for the silicide, thus providing a wide range of magnetic switching temperatures.

DESCRIPTION OF THE PREFERRED EMBODIMENTS

The following Examples are meant to illustrate but not to limit this invention. The $\sigma$ values for magnetization employed herein are basic units for measuring magnetism. See, for example, Bozorth, "Ferromagnetism," D. Van Nostrand Company, N.Y. 1951 (at pages 5–8). The sigma values reported herein have been determined in fields of 4,000–4,400 oersteds on apparatus similar to that described by T. R. Bardell on pages 226–228 of "Magnetic Materials in the Electrical Industry," Philosophical Library, N.J., 1955.

EXAMPLE 1

$Mn_{0.96}CoGe$

A composition was prepared by mixing together 33.8 parts of Co, 33.8 parts of Ge and 32.4 parts of Mn into an alumina vessel. The vessel was placed inside a quartz tube through which flowed a stream of high purity argon. The tube was inserted in an induction furnace and the sample melted and cooled to produce a single ingot. The ingot was homogenized by repeated passage of a molten zone back and forth along the ingot (zone leveling). The cooled ingot contained by analysis 31.7% of Co and 28.6% of Mn in good agreement with that calculated from initial bulk composition (32.0% Co; 28.6% Mn). X-ray analysis at room temperature indicated that the composition consisted of a single hexagonal phase having a $Ni_2In$ type lattice. Metallographic examination confirmed the absence of a second phase.

Measurement of magnetization in an applied field of 10 kilo-oersteds as a function of temperature showed the composition to be ferromagnetic below 272°K and paramagnetic above that temperature. The plot of reduced magnetization $\sigma/\sigma_o$ versus the relative temperature $T/T_c$ agreed with general theoretical curves of Bean and Rodbell given in Phys. Rev. 126 104–115 (1962) indicating that the Curie temperature, $T_c$, coincided with a first order phase transition. Low temperature X-ray diffraction at 77°K confirmed that at low temperatures the composition consisted entirely of an orthorhombic phase. It was observed that individual crystals of this composition, whose formula corresponds to $Mn_{0.96}CoGe$, shattered when cooled through the phase transition at 272°K. This reversible phase transition characterized all portions of the ingot except a small portion at one end which showed only a second order magnetic transition. Magnetization extrapolated to 0°K. was approximately 125 emu/g.

EXAMPLE 2

MnCoGe

Amounts of 2.748 g of Mn, 2.947 g of Co and 3.630 g of Ge, each of high purity grade, were transferred to an alumina crucible which was sealed within an evacuated silica tube. The crucible was then heated for 16 hours at 980°C. and furnace cooled. The product, now entirely magnetic, was broken-up, resealed again in an evacuated silica tube and heated at 1,050°C. for 12 hours. After cooling, the product appeared to be a once molten, but shattered ingot. It was thereafter ground to a fine powder and annealed at 850°C. for 4 days. After cooling to room temperature the product had the appearance of a sintered mass that had shattered on cooling.

X-ray data obtained with a Guinier camera at room temperature showed an orthorhombic crystal structure of the TiNiSi type with $a = 5.952A$, $b = 3.822A$, $c = 7.050A$. DTA measurements showed endotherms at 76°C. and 125°C. Magnetic measurement indicated a Curie temperature at 69°C. Using a high temperature X-ray diffractometer the structure above 125°C. was shown to be the hexagonal $Ni_2In$ type. The volume change calculated from the cell dimensions was determined to be −3.9 percent on heating through the transformation temperature.

The magnetization of a composition prepared in similar fashion was measured on a vibrating sample magnetometer as a function of temperature. The composition was magnetic ($\sigma 4.2°K = 116$ emu/g) with a Curie Temperature, $T_c = 360°K$.

EXAMPLE 3

$Mn_{0.975}CoGe$

Amounts of 2.9289 g of Mn, 3.2224 g of Co and 3.9692 g of Ge were sealed in an alumina crucible in a silica tube under vacuum and reacted at 1,050°C. for 12 hours. The composition was ground and reannealed at 850°C. for 3 days; it showed no indication of cracking upon cooling. Guinier data showed a hexagonal $Ni_2In$ type structure at room temperature with $a = 4.0835$A, $c = 5.3097$A. DTA showed an endothermic crystallographic transition at 23°C. on heating. This composition had a magnetization, $\sigma_s$ of 110 emu/g at 4.2°K. $T_c$ was measured at 282°K on heating and 272°K on cooling.

A similarly prepared composition, $Mn_{0.95}CoGe$, had a hexagonal crystal structure at room temperature and was nonmagnetic. Measurement of magnetization indicated a Curie temperature of 262°K, but the composition showed no transformation from the hexagonal structure at temperatures down to 4.2°K. Such composition is not included within the scope of this invention.

EXAMPLE 4

MnNiGe

Amounts of 3.2132 g of Mn, 3.4338 g of Ni and 4.2456 g of Ge were placed in an alumina crucible sealed within a silica tube under vacuum and reacted at 980°C. for 12 hours. The composition was furnace cooled to 600°C. and thereafter air cooled. The ingot shattered on cooling and was weakly magnetic. The sample was then ground to powder and annealed in alumina-silica at 850°C. The sintered compact broke up when cooled. X-ray data showed the orthorhombic TiNiSi type structure at room temperature with $a = 6.0421$A, $b = 3.7550$A, $c = 7.0860$A. DTA showed an endotherm on heating indicating a crystallographic transition at 220°C. X-ray data showed almost complete conversion to the hexagonal $Ni_2In$ type at 250°C. with a volume change of 1.7 percent. This composition was magnetic. A similar sample showed a magnetization of about 6 emu/g at room temperature and a Curie Temperature about 380°K.

EXAMPLE 5

$MnCoGe_{0.90}Si_{0.10}$

Amounts of 1.5092 g of Mn, 1.6190 g of Co, 1.7947 g of Ge and 0.07716 g of Si were mixed as powders, sealed in alumina-silica and fired at 950°C. for 2 days. The composition was then ground, resealed and annealed at 1,000°C. for 4 days. X-ray data showed the orthorhombic TiNiSi type structure at room temperature. DTA showed a crystallographic transition at 205°C. on heating. This composition was magnetic with a room temperature magnetization of 67 emu/g and a Curie Temperature of 350°K.

EXAMPLE 6

$MnCoGe_{0.50}Si_{0.50}$

Amounts of 3.3456 g of Mn, 3.5889 g of Co, 2.2103 g of Ge and 0.8552 g of Si were sealed under vacuum in an alumina crucible in a silica envelope and reacted at 950°C. for 2 days. The composition was cooled, reground and annealed at 1,000°C. for 4 days. X-ray diffraction at room temperature showed the orthorhombic TiNiSi type structure and DTA indicated a crystallographic transition temperature, $T_t$, of 690°C. on heating. This composition was strongly attracted to a magnet at room temperature.

EXAMPLE 7

$MnNiGe_{0.50}Si_{0.50}$

Amounts of 1.6751 g of Mn, 1.7901 g of Ni, 1.1066 g of Ge and 0.4282 g of Si were reacted under vacuum in alumina-silica at 950°C. for 4 days. The composition was reground and annealed at 950°C. for 2½ days. The X-ray diffraction pattern showed orthorhombic TiNiSi type structure at room temperature and DTA indicated $T_t$ of 641°C. on heating. This composition was strongly attracted to a magnet at room temperature.

The embodiments of the invention in which an exclusive property or privilege is claimed are defined as follows:

1. A composition of the formula $$Mn_{1-\alpha}(Co_{1-y}Ni_y)_{1-\beta}Si_zGe_{1-z}$$

wherein
 $y$ is 0 to 1.0
 $z$ is 0 to 0.6 and
 $\alpha + \beta$ is 0 to 0.1 having orthorhombic crystal structure at 270°K and transforming with accompanying volume decrease to hexagonal crystal structure at a temperature above 270°K and up to about 1,000°K.

2. A composition according to claim 1, $Mn_{1-\alpha}Co_{1-\beta}Ge$ ($Mn_{1-\alpha}Co_{1-y}Ge$), wherein $\alpha$ and $\beta$ (y) are defined in claim 1.

3. A composition according to claim 2, MnCoGe.

4. A composition according to claim 2, $Mn_{0.96}CoGe$.

5. A composition according to claim 2, $Mn_{0.975}CoGe$.

6. A composition according to claim 1, $Mn_{1-\alpha}Ni_{1-\beta}Ge$ ($Mn_{1-\alpha}Ni_yGe$), wherein $\alpha$ and $\beta$ are as defined in claim 1.

7. A composition according to claim 6, MnNiGe.

8. A composition according to claim 1, $MnCoSi_zGe_{1-z}$ wherein $z$ is as defined in claim 1.

9. A composition according to claim 8, $MnCoSi_{0.10}Ge_{0.90}$.

10. A composition according to claim 9, $MnCoSi_{0.50}Ge_{0.50}$.

11. A composition according to claim 1, $MnNiSi_zGe_{1-z}$ wherein $z$ is as defined in claim 1.

12. A composition according to claim 11, $MnNiSi_{0.50}Ge_{0.50}$.

13. A composition according to claim 1 having orthorhombic crystal structure.

14. A composition according to claim 1 having hexagonal crystal structure.

* * * * *

UNITED STATES PATENT OFFICE
CERTIFICATE OF CORRECTION

PATENT NO. : 3,844,775
DATED : October 29, 1974
INVENTOR(S) : Alfred E. Austin

It is certified that error appears in the above-identified patent and that said Letters Patent are hereby corrected as shown below:

Abstract, line 2 - "$Mn_{1-\beta}$" should be --$Mn_{1-\alpha}$--;

Col. 2, line 36 - "$V_{hex.} = a2c \sin 120°$" should be --$V_{hex.} = a^2 c \sin 120°$--;

Col. 6, line 43, claim 2 - delete "$(Mn_{1-\alpha} Co_{1-y} Ge)$" and "(y)";

Col. 6, line 51, claim 6 - delete "$(Mn_{1-\alpha} Ni_y Ge)$".

Signed and Sealed this twenty-ninth Day of July 1975

[SEAL]

Attest:

RUTH C. MASON
Attesting Officer

C. MARSHALL DANN
Commissioner of Patents and Trademarks